US010046501B2

(12) United States Patent
Hwang et al.

(10) Patent No.: US 10,046,501 B2
(45) Date of Patent: Aug. 14, 2018

(54) SYSTEM AND METHOD FOR POLYMER EXTRUSION

(71) Applicant: Chevron Phillips Chemical Company LP, The Woodlands, TX (US)

(72) Inventors: Chih-An Hwang, Humble, TX (US); Keith A. Bravenec, Friendswood, TX (US); Christopher J. Hunt, Houston, TX (US)

(73) Assignee: Chevron Phillips Chemical Company LP, The Woodland, TX (US)

( * ) Notice: Subject to any disclaimer, the term of this patent is extended or adjusted under 35 U.S.C. 154(b) by 1015 days.

(21) Appl. No.: 13/800,311

(22) Filed: Mar. 13, 2013

(65) Prior Publication Data

US 2014/0264991 A1   Sep. 18, 2014

(51) Int. Cl.
*B29C 47/92* (2006.01)
*B29C 47/36* (2006.01)
*B29C 47/00* (2006.01)
*B29B 9/06* (2006.01)

(52) U.S. Cl.
CPC ............ *B29C 47/92* (2013.01); *B29C 47/364* (2013.01); *B29B 9/06* (2013.01); *B29C 47/0011* (2013.01); *B29C 47/0066* (2013.01); *B29C 2947/92019* (2013.01); *B29C 2947/9238* (2013.01); *B29C 2947/9259* (2013.01); *B29C 2947/92952* (2013.01)

(58) Field of Classification Search
CPC ... B29C 47/92; B29C 47/364; B29C 47/0011; B29C 47/0066; B29C 2947/92019; B29C 2947/9238; B29C 2947/9259; B29C 2947/92952; B29B 9/06
See application file for complete search history.

(56) References Cited

U.S. PATENT DOCUMENTS

| | | | | | |
|---|---|---|---|---|---|
| 3,619,433 | A | * | 11/1971 | Windley | .................. D01D 1/09 264/176.1 |
| 4,213,747 | A | * | 7/1980 | Friedrich | .............. B29C 47/367 264/211.12 |
| 4,241,602 | A | * | 12/1980 | Han | ....................... G01N 11/08 73/54.11 |
| 4,350,657 | A | * | 9/1982 | Jones | .................... B29C 47/367 264/211.21 |
| 4,449,395 | A | * | 5/1984 | Kurtz | ..................... G01N 11/04 73/54.11 |
| 4,452,750 | A | * | 6/1984 | Handwerk | ................ B29B 9/06 264/142 |
| 4,478,775 | A | * | 10/1984 | Endo | ..................... B29C 47/367 264/40.1 |

(Continued)

*Primary Examiner* — Kevin R Kruer
(74) *Attorney, Agent, or Firm* — Fletcher Yoder P.C.

(57) ABSTRACT

Techniques are provided for polymer extrusion. A polyolefin extrusion system may include an extrusion gear pump configured to receive a narrow molecular weight distribution polyolefin from a polyolefin manufacturing system. The polyolefin extrusion system may also include a motor of the extrusion gear pump configured to drive the extrusion gear pump, a pressure sensor configured to generate a pressure signal indicative of a suction pressure into the extrusion gear pump, an automation controller configured to generate an output signal based on the pressure signal, and a variable speed drive configured to control operation of the motor.

20 Claims, 3 Drawing Sheets

(56) References Cited

U.S. PATENT DOCUMENTS

| | | | | |
|---|---|---|---|---|
| 4,501,498 A * | 2/1985 | McKelvey | ............ | B29C 47/367 366/145 |
| 4,578,316 A * | 3/1986 | Clauson | ................. | B32B 27/32 156/244.11 |
| 4,721,589 A * | 1/1988 | Harris | .................. | B29C 47/367 264/40.1 |
| 4,902,455 A * | 2/1990 | Wobbe | ................. | B29C 47/367 264/102 |
| 4,933,886 A * | 6/1990 | George | ................. | G01N 11/08 264/40.6 |
| 4,944,903 A * | 7/1990 | Nilsson | .............. | B29C 47/0026 264/169 |
| 5,113,353 A * | 5/1992 | George | ............... | G01N 11/162 702/43 |
| 5,122,315 A * | 6/1992 | Darley | ................. | B29C 47/367 264/40.1 |
| 5,179,521 A * | 1/1993 | Edge | ......................... | B29B 7/72 264/40.3 |
| 5,191,537 A * | 3/1993 | Edge | ......................... | B29B 7/72 366/132 |
| 5,347,852 A * | 9/1994 | Mode | ....................... | B29C 47/92 73/54.04 |
| 5,728,335 A | 3/1998 | Neubauer | | |
| 5,974,866 A * | 11/1999 | Tjahjadi | ............. | B29C 47/0011 425/115 |
| 6,409,373 B1 | 6/2002 | Tanaka et al. | | |
| 6,854,967 B2 * | 2/2005 | Tsutsui | ................... | B29C 45/77 264/328.1 |
| 6,920,821 B2 * | 7/2005 | Ariji | ....................... | B30B 15/18 100/269.12 |
| 7,504,056 B2 * | 3/2009 | Kobayashi | ............ | B29C 47/003 264/167 |
| 7,897,710 B2 | 3/2011 | Amos et al. | | |
| 8,017,002 B2 * | 9/2011 | Woestmann | .......... | B29C 47/681 210/134 |
| 8,110,644 B2 | 2/2012 | Coffy et al. | | |
| 8,246,875 B2 * | 8/2012 | Shinohara | ................ | B29B 9/06 264/141 |
| 8,470,223 B2 * | 6/2013 | Nakai | ................... | B29C 43/222 264/1.1 |
| 8,500,414 B2 * | 8/2013 | Aregger | .................... | F04C 2/18 417/410.4 |
| 8,579,494 B2 * | 11/2013 | Holt | ...................... | A21C 11/20 366/100 |
| 9,333,674 B2 * | 5/2016 | Asagiri | .................... | B29B 7/726 |
| 2002/0089077 A1 * | 7/2002 | Ogawa | .................... | B29C 47/32 264/40.6 |
| 2003/0042645 A1 * | 3/2003 | Ichikawa | .............. | B29C 47/0007 264/102 |
| 2003/0192367 A1 * | 10/2003 | Lin | ......................... | B29C 47/92 73/54.42 |
| 2004/0032040 A1 * | 2/2004 | Harris | ..................... | B29C 47/92 264/40.1 |
| 2004/0060345 A1 * | 4/2004 | Eggen | .................... | G01N 11/08 73/54.41 |
| 2005/0132902 A1 * | 6/2005 | D'Arcangelis | .......... | A23G 9/20 99/455 |
| 2005/0255187 A1 * | 11/2005 | Kazmer | .................... | B29C 45/23 425/563 |
| 2006/0081288 A1 * | 4/2006 | Jacobsen | ............. | F16K 31/0637 137/14 |
| 2006/0138690 A1 * | 6/2006 | Schwaiger | .............. | B29C 47/92 264/40.6 |
| 2007/0007680 A1 * | 1/2007 | Henri Barre | ........ | B29C 47/0026 264/40.1 |
| 2007/0007681 A1 * | 1/2007 | Chevillard | .......... | B29C 47/0026 264/40.1 |
| 2007/0043177 A1 * | 2/2007 | Michie, Jr. | .......... | B29C 47/0014 526/65 |
| 2007/0109911 A1 | 5/2007 | Neubauer | | |
| 2009/0054637 A1 * | 2/2009 | Ueda | .................... | B29C 47/0021 536/56 |
| 2009/0080282 A1 * | 3/2009 | Skibba | .................... | B29C 47/10 366/76.2 |
| 2009/0130382 A1 * | 5/2009 | Otoshi | ................ | B29C 47/0021 428/131 |
| 2009/0268292 A1 * | 10/2009 | Nakai | ..................... | B29C 71/02 359/488.01 |
| 2010/0032866 A1 * | 2/2010 | Nakai | ................. | B29C 71/0072 264/291 |
| 2010/0322805 A1 * | 12/2010 | Aregger | ..................... | F04C 2/18 418/2 |
| 2010/0322806 A1 * | 12/2010 | Aregger | ..................... | F04C 2/18 418/2 |
| 2013/0229888 A1 * | 9/2013 | Asagiri | ................... | B29B 7/726 366/77 |
| 2014/0264991 A1 * | 9/2014 | Hwang | ................... | B29C 47/92 264/40.5 |

\* cited by examiner

SYSTEM AND METHOD FOR POLYMER EXTRUSION

BACKGROUND

The present disclosure relates generally to polymer extrusion systems, and more particularly, to polymer extrusion systems of polyolefin manufacturing systems.

This section is intended to introduce the reader to aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains or polymers have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging, household containers, household items, automobile components, pipes, conduits, and various industrial products.

Specific types of polyolefins, such as high-density polyethylene (HDPE), have particular applications in the manufacture of extruded, blow-molded, and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application (e.g., tensile strength, impact strength, modulus, and hardness), the physical requirements (e.g., thermal stability, molecular weight, and density), and the phase behavior (e.g., glass transition temperature, melt and melt crystallization temperatures) typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial, and industrial uses for polyolefins has translated into a substantial demand for raw polyolefin which can be extruded, injected, blown, or otherwise formed into a final consumable product or component.

To satisfy this demand, various processes exist by which olefins may be polymerized to form polyolefins. Typically, these processes are performed at or near petrochemical facilities, which have ready access to the short-chain olefin molecules (monomers and comonomers), such as ethylene, propylene, butene, pentene, hexene, octene, decene, and other building blocks, of the much longer polyolefin polymers. These monomers and comonomers may be polymerized in a liquid-phase polymerization reactor and/or gas-phase polymerization reactor to form a product including polymer (polyolefin) solid particulates, typically called fluff or granules. The fluff may possess one or more melt, physical, rheological, and/or mechanical properties of interest, such as density, melt index (MI), melt flow rate (MFR), copolymer content, comonomer content, modulus, and crystallinity. The reaction conditions within the reactor, such as temperature, pressure, chemical concentrations, residence time, polymer production rate, and so forth, may be selected to achieve the desired fluff properties.

The fluff from the reactors may be mixed with additives and/or further processed before being used to produce the goods and products listed above. For example, the fluff may be extruded in an extruder and passed through a pelletizer to form polymer pellets, which may be easier to handle and transport to manufacturers of plastic goods than fluff. High pressures may be used in the extruder and pelletizer to convert the fluff into pellets. It is now recognized that undesirable issues may arise when the pressure within the extruder varies excessively and/or exceeds certain thresholds. For example, certain equipment associated with the extruder may be shut down when a high-pressure threshold is exceeded, thereby interrupting pellet production and/or causing reactor production rates to be reduced. Such unwanted production upsets may reduce the efficiency of the polyolefin manufacturing system, increase expenses associated with production of the pellets, increase maintenance costs, and/or contribute to poor equipment reliability.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

Figure 1:
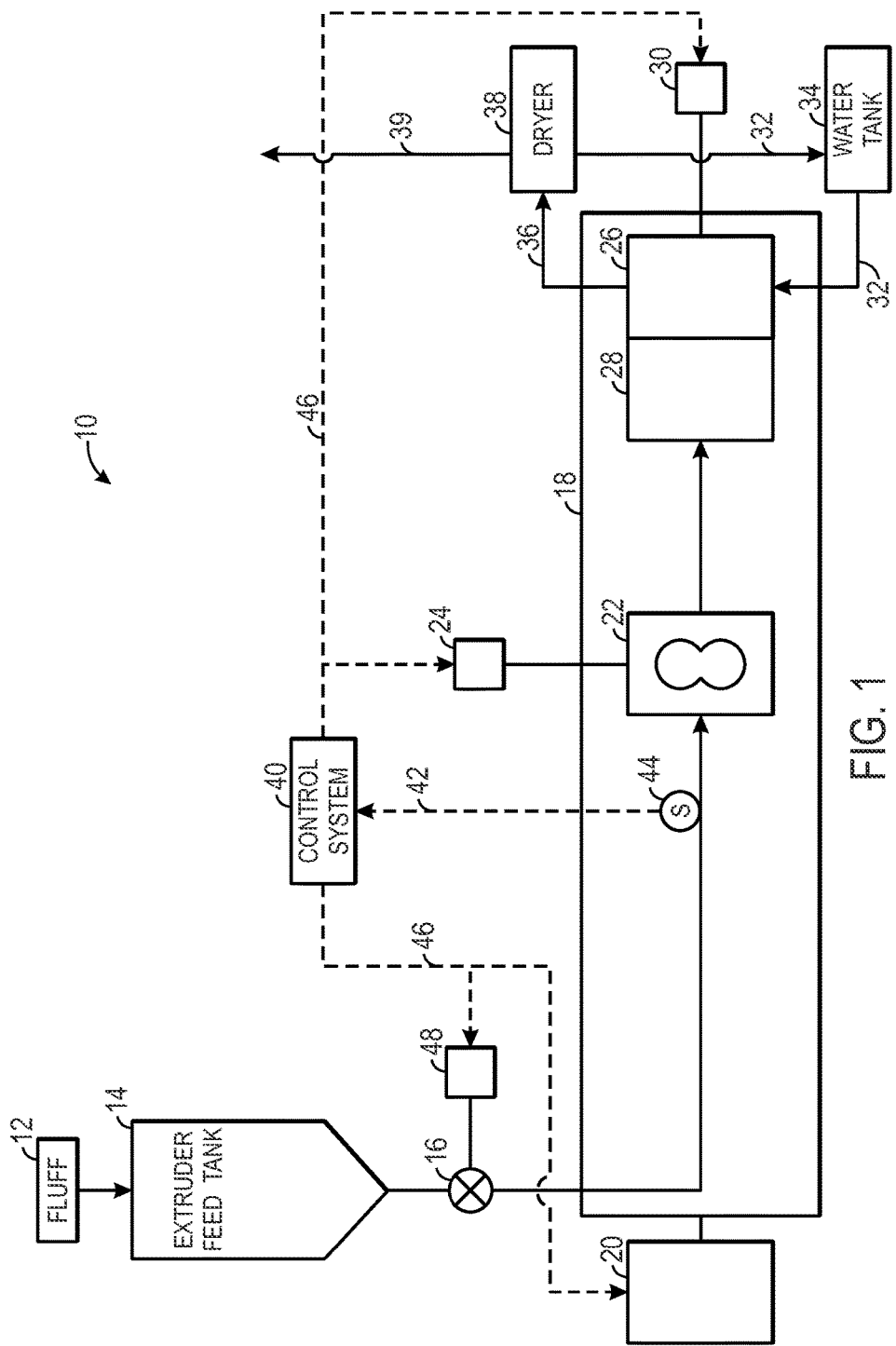
FIG. 1 is a process flow diagram of an extrusion system in accordance with present embodiments.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques for polyolefin manufacturing. More specifically, the present disclosure is directed to techniques for polyolefin extrusion, such as with an extruder and an extrusion gear pump. The extrusion gear pump may be part of a polyolefin manufacturing system, which may react a monomer, a diluent, and a catalyst to produce polymers in a reactor system of the polyolefin manufacturing system. Polymer fluff produced in the reactor system may be separated from diluent and unreacted monomer in a diluent monomer recovery system of the polyolefin manufacturing system. The polymer fluff from the diluent monomer recovery system may then be extruded and pelletized to produce polymer pellets in an extrusion/loadout system of the polyolefin manufacturing system before being distributed to customers. Specifically, the extrusion/loadout system may include the extruder, which may melt, blend, homogenize, and pump the polyolefin polymer and any additional additives through a pelletizer, which may cut the polyolefin melt extruded through a die into pellets. The pellets may be quenched using water and dried before distribution to customers. In certain embodiments, the extruder may include the extrusion gear pump to help pump the polymer melt through the extruder.

Operation of the extrusion/loadout system may pose several challenges to the cost-effective and efficient operation of the polyolefin manufacturing system. For example, various criteria may be associated with the operation of the extrusion gear pump, such as a suction pressure of the extrusion gear pump. Operation of the extrusion gear pump within these criteria may provide reliable operation of the extrusion gear pump. Thus, control systems associated with the polyolefin manufacturing system may shut down or trip the extrusion gear pump when one or more of the criteria are reached or are about to be reached. Shutting down the extrusion gear pump may affect operation of the extrusion/loadout system and/or other parts of the polyolefin manufacturing system, thereby causing delays and/or loss of production. Such unplanned outages may result in increased expenses associated with the production of the polyolefin by the polyolefin manufacturing system. Thus, reducing the frequency of unplanned outages of the extrusion gear pump may be highly desirable.

By using the disclosed techniques, the extrusion gear pump may be controlled to operate within certain criteria such that the number of unplanned shutdowns of the extrusion gear pump is reduced. For example, to the extent that exceeding a high suction pressure criterion of the extrusion gear pump contributes to unplanned outages, the disclosed techniques may enable the suction pressure of the extrusion gear pump to be controlled in an improved and more robust manner to help prevent undesired shutdowns or trips of the extrusion gear pump. Specifically, the disclosed techniques may improve the control of the extrusion gear pump over a range of operating rates of the extruder. By reducing unplanned outages of the extrusion gear pump, the disclosed techniques may enable the operating time and reliability of the extrusion/loadout system and the polyolefin manufacturing system to be increased, thereby reducing the expenses associated with the polyolefin produced by the polyolefin manufacturing system.

As described in detail below, the disclosed techniques include a control system that includes one or more automation controllers to control the extrusion gear pump to help maintain the suction pressure of the extrusion gear pump below a high suction pressure threshold. In the following discussion, the term "automation controller" may refer to various control systems and controllers, such as distributed control systems, programmable logic controllers, and the like. The possibility of exceeding the high suction pressure threshold of the extrusion gear pump may be greater during startup of the extrusion gear pump. Thus, the disclosed techniques may be especially useful during startup of the extrusion gear pump to help reduce the number of trips and shutdowns of the extrusion gear pump associated with exceeding the high suction pressure threshold. As described in detail below, the control system associated with the extrusion gear pump may include certain components and/or be configured in such a way that the suction pressure of the extrusion gear pump is controlled in an improved manner compared to other control systems that do not include the specified components or are not configured according to the disclosed embodiments. Specifically, the variation of the extrusion gear pump suction pressure during startup may be reduced when the pump is controlled using the disclosed techniques. Thus, use of embodiments of the disclosed control system during operation of the extrusion gear pump may help increase efficiency, increase production, and/or decrease expenses of the polyolefin manufacturing system. For example, by reducing the number of start attempts associated with the extrusion gear pump, the life of the pump and associated equipment (e.g., pump motor) may be extended. In addition, improved control of the extrusion gear pump may enable the extruder to be operated at higher rates, both during startups and normal operation. Further, improved control of the extrusion system may improve the quality and consistency of the polyolefin.

In one embodiment, several components of the control system associated with the extrusion gear pump may cooperate with one another to improve the control of the suction pressure of the extrusion gear pump. Specifically, the control system may include a distributed control system (DCS), a first programmable logic controller (PLC), a second PLC, and a variable speed drive (VSD) interconnected with one another. For example, dedicated hardwire connections may be used between the DCS and the first PLC to help eliminate inconsistency and delay associated with the communication and execution between the DCS and first PLC. In addition, the first PLC may be a relatively fast PLC with a scanning speed of less than approximately 20 milliseconds. The VSD drive may include an integral, built-in controller to provide enhanced control and tuning of the extrusion gear pump motor. Further, the tuning parameters of the first PLC may incorporate various equipment lag times to help reduce oscillations of the extrusion gear pump suction pressure. Moreover, various signals between the DCS and first and second PLCs may be synchronized during mode switches or changes (e.g., from manual mode to automatic mode or vice versa) of the extrusion gear pump to help reduce variability of the extrusion gear pump suction pressure after the mode switch (i.e., a bumpless transfer). When such a control system is assembled, configured, interconnected, and operated, improved control of the extrusion gear pump suction pressure may be obtained and in fact, has been demonstrated in a polyolefin manufacturing system that has been operating for several months. For example, the polyolefin manufacturing system has experienced fewer shutdowns of the extruder and extrusion gear pump caused by the suction pressure exceeding a high pressure threshold. Accordingly, startup of the extruder and extrusion gear pump has been simplified and improved, and production rates of the polyolefin manufacturing system have increased.

FIG. 1 depicts an embodiment of an extrusion system 10 that provides improved reliability in the operation of the extrusion system 10. Polyolefin fluff 12 produced in a polyolefin reactor system may be pneumatically transferred into an extruder feed tank 14. Downstream, rotary valve 16 may feed polyolefin fluff 12 to an extruder 18, which may be driven by an extruder motor 20. The fluff 12 from the extruder feed tank 14 may be metered to the extruder 18 with a variety of meters, such as smart flowmeter-type, master-feeder type, and so forth. In certain embodiments, various process stabilizers and additives may be added to the polyolefin fluff moving through the extruder 18. In further embodiments, the extruder 18 may include an extrusion gear pump 22, which may be driven by an extrusion gear pump motor 24. The extrusion gear pump 22 may be used to help convey and/or increase a pressure of the polyolefin fluff moving through the extruder 18. In general, the extruder 18 may melt, blend, homogenize, and pump the polyolefin polymer and additives through a pelletizer 26, which may include a screen pack and heated die head 28. The pelletizer 26 may be driven by a pelletizer motor 30 and may include pelletizer knife blades, which may cut the polyolefin melt extruded through the die into pellets. The pellets are typically quenched by water 32 supplied by a water tank 34 and may travel in a pellet-water slurry 36 from the pelletizer 26 to a pellet dewatering dryer 38. The dryer 38 may separate the free water and then dry the remaining surface water from the pellets by centrifugal force. Water 32 removed from the pellet dryer 38 may return to the water tank 34. Dried polyolefin pellets 39 may eventually be transported to pellet silos and distributed to customers. Examples of polyolefin pellets 39 include low density polyethylene (LDPE), linear low density polyethylene (LLDPE), medium density polyethylene (MDPE), high density polyethylene (HDPE), and enhanced polyethylene. Further, the pellets 39 may include blends of these resins. The various types and grades of polyethylene pellets may be marketed, for example, under the brand names Marlex® polyethylene or MarFlex™ polyethylene of Chevron Phillips Chemical Company LP, of The Woodlands, Tex., USA.

In certain embodiments, the polyolefin fluff extruded by the extruder 18 may be characterized by various physical properties. For example, the polyolefin fluff may have a particular molecular weight distribution. Some polyolefin fluff may include polymers with approximately the same molecular weight and other polyolefin fluff may include polymers with a range of molecular weights. A weight average molecular weight (i.e., $M_w$) of the polyolefin fluff may be divided by a number average molecular weight (i.e., $M_n$) of the polyolefin fluff to obtain a value (e.g., a polydispersity index) that quantifies the molecular weight distribution of the polyolefin fluff. In certain embodiments, the polydispersity index of the polyolefin fluff may be between approximately 2 to approximately 4 and such polyolefin fluff may be referred to as a narrow molecular weight distribution polyolefin. The narrow molecular weight distribution polyolefin may exhibit less shear thinning than wide molecular weight distribution polyolefin, and thus, the viscosity of the narrow molecular weight distribution polyolefin in the extruder 18 may be higher than wide molecular weight distribution polyolefin. Accordingly, higher pressures and/or temperatures may be used to convey the narrow molecular weight distribution polyolefin through the extruder 18 because the narrow molecular weight distribution polyolefin may be more difficult to melt within the extruder. The higher pressures associated with extruding the narrow molecular weight distribution polyolefin through the extruder 18 may be closer to the high suction pressure criteria of the extrusion gear pump 22. Thus, the extrusion gear pump 22 may be more likely to shut down when extruding the narrow molecular weight distribution polyolefin, especially during startup of the extrusion gear pump 22. As discussed in detail below, the disclosed techniques may be particularly useful to improve control of the suction pressure of the extrusion gear pump 22 when the extruder 18 is extruding the narrow molecular weight distribution polyolefin, which may be at least partially melted. More generally, the disclosed techniques may be used to improve control of the suction pressure of the extrusion gear pump 22 when the extruder 18 is extruding any type of polyolefin, and are not limited to only narrow molecular weight distribution polyolefins.

Returning to FIG. 1, a control system 40 may be used to control one or more aspects of the extrusion system 10. For example, the control system 40 may receive one or more input signals 42 from one or more sensors 44 distributed throughout the extrusion system 10. Although the sensor 44 shown in FIG. 1 is disposed upstream of the extrusion gear pump 22, in other embodiments, one or more sensors 44 may be disposed anywhere throughout the extrusion system 10. Examples of the sensors 44 include, but are not limited to, pressure sensors, flow meters, temperature sensors, level meters, analyzers, or any combination thereof. The control system 40 may use the information provided by the input signals 42 to generate one or more output signals 46 to control the extrusion system 10. Specifically, the output signals 46 may be used to control various devices, such as, but not limited to, control valves, pumps, rotating machinery, motors, actuators, or any combination thereof. For example, the control system 40 may send output signals to one or more of an actuator 48 of the rotary valve 16, extruder motor 20, extrusion gear pump motor 24, pelletizer motor 30, or any combination thereof. As described in detail below, embodiments of the control system 40 may include unique components and/or the control system 40 may be configured such that the control of the extrusion gear pump 22 may be improved. For example, the control system 40 may be used to reduce the frequency of trips and shutdowns of the extrusion gear pump 22 by improving the control of the suction pressure of the extrusion gear pump 22.

Figure 2:
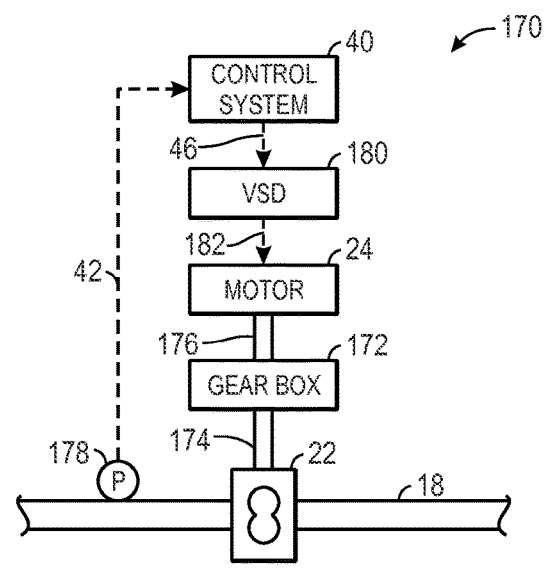
FIG. 2 is a process flow diagram of the extrusion gear pump of FIG. 1, in accordance with present embodiments.

FIG. 2 depicts an embodiment 170 of the extrusion gear pump 22 and related control features. In the illustrated embodiment, a gearbox 172 may be disposed between the extrusion gear pump 22 and the extrusion gear pump motor 24. The gearbox 172 may include one or more gears and/or gear trains to enable conversion of speed and/or torque between the extrusion gear pump 22 and the extrusion gear pump motor 24. For example, the extrusion gear pump motor 24 may have a higher maximum rotational speed than that of the extrusion gear pump 22. Thus, the gearbox 172 may be used to convert the higher speed of the extrusion gear pump motor 24 to a lower speed to drive the extrusion gear pump 22. For example, in certain embodiments, the gearbox 172 may have a gear ratio between approximately 20:1 to approximately 40:1, or between approximately 25:1 to approximately 35:1. As shown in FIG. 2, an extrusion gear pump shaft 174 may couple the extrusion gear pump 22 to the gearbox 172 and an extrusion gear pump motor shaft 176 may couple the extrusion gear pump motor 24 to the gearbox 172.

An extrusion gear pump suction pressure sensor 178 may be disposed upstream of the extrusion gear pump 22. Specifically, the extrusion gear pump suction pressure sensor 178 may be coupled to the extruder 18 and arranged to provide an indication of the suction pressure of the extrusion gear pump 22. The extrusion gear pump suction pressure sensor 178 may send the input signal 42 to the control system 40. Based on the value of the suction pressure provided by the extrusion gear pump suction pressure sensor 178, the control system 40 may generate the output signal 46 to control the operation of the extrusion gear pump 22. Specifically, there may be an inverse relationship between the speed of the extrusion gear pump 22 and the suction pressure of the extrusion gear pump 22. In other words, the control system 40 may direct the extrusion gear pump 22 to operate at a slower speed if the suction pressure is below a threshold, thereby increasing the suction pressure. Similarly, the control system 40 may direct the extrusion gear pump 40 to run at a faster speed if the suction pressure is above a threshold, thereby decreasing the suction pressure. In the illustrated embodiment, the output signal 46 may be provided to a variable-speed drive (VSD) 180, which may be used to control the speed of the extrusion gear pump motor 24. Various types of VSDs 180 may be used to control the speed of the extrusion gear pump motor 24, such as, but not limited to, mechanical, electromechanical, hydraulic, or electronic types of VSDs. In the illustrated embodiment, the VSD 180 sends a speed signal 182 to the extrusion gear pump motor 24. In certain embodiments, the speed signal 182 may also include an indication of the electric current being supplied to the extrusion gear pump motor 24. As discussed in detail below, use of the VSD 180 together with the control system 40 enables improved control of the extrusion gear pump 22 in response to fluctuations of the extrusion gear pump suction pressure.

Figure 3:
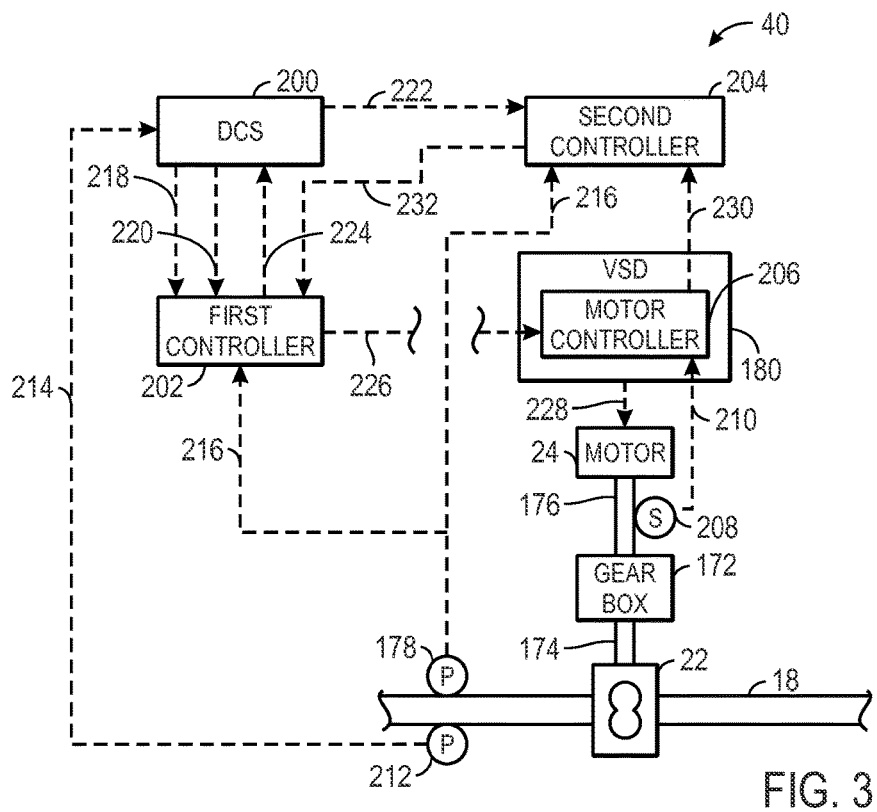
FIG. 3 is a schematic diagram of a control system for the extrusion gear pump of FIG. 1, in accordance with present embodiments.

FIG. 3 depicts an embodiment of the control system 40 for the extrusion gear pump 22. The control system 40 may include a distributed control system (DCS) 200, which may be used to control the polyolefin manufacturing system that includes the extrusion system 10. The DCS 200 may be any type of control system (e.g., an automation controller) in which the controller elements are distributed throughout the system. Thus, the DCS 200 may be used to control various components of the polyolefin manufacturing system. As shown in FIG. 3, the control system 40 may also include a first controller 202. In certain embodiments, the first controller 202 may be an automation controller or a programmable logic controller (PLC), which may be a digital computer used for automation of electromechanical processes. Unlike general purpose computers, PLCs are designed for multiple inputs and outputs, extended temperature ranges, immunity to electrical noise, and resistance to vibration and impact. The programs of the PLC may be stored in battery-backed-up or nonvolatile memory. In certain embodiments, the first controller 202 may include a processor, a digital input/output (I/O) module, an analog I/O module, a communication module (e.g., an Ethernet module), or any combination thereof. In further embodiments, the first controller 202 may include a human-machine-interface (HMI) to provide indication of various controller variables and to enable operator access for tuning parameter changes. The first controller 202 may have certain features that enable the control system 40 to provide improved control of various parameters of the extrusion system 10, such as the suction pressure of the extrusion gear pump 22. For example, a scanning speed of the first controller 202 may be less than approximately 20 milliseconds. Such a fast scanning speed of the first controller 202 may enable the control system 40 to respond to variations in the suction pressure of the extrusion gear pump 22 faster than other controllers. In addition, an I/O update time (i.e., time delay between updates of input or output signals) of the first controller may be less than approximately 10 milliseconds, which also helps the first controller 202 to provide improved control of the extrusion gear pump 22 suction pressure.

In certain embodiments, the control system 40 also includes a second controller 204, which may also be an automation controller or PLC. The functions of the first and second controllers 202 and 204 may differ from one another, as described in detail below. In the illustrated embodiment, the VSD 180 may include an integral motor controller 206, which may provide for enhanced functionality of the VSD 180. For example, a tachometer 208 may be coupled to the extrusion gear pump motor shaft 176 of the extrusion gear pump motor 24 and provide a speed feedback signal 210 to the motor controller 206. In other words, the tachometer 208 provides an indication of the actual speed of the extrusion gear pump motor 24 to the motor controller 206. In certain embodiments, the tachometer 208 may be set up in a differential mode to reduce noise interference in the speed feedback signal 210.

In addition to the extrusion gear pump suction pressure sensor 178, certain embodiments may include a redundant extrusion gear pump suction pressure sensor 212 that provides a redundant suction pressure signal 214 to the DCS 200. In certain embodiments, a primary extrusion gear pump suction pressure signal 216 is sent from the extrusion gear pump suction pressure sensor 178 to the first controller 202 as an analog input via a dedicated hardwire connection with the sensor 178. Such a dedicated connection may reduce or eliminate any translation errors or bumps. In other embodiments, as shown in FIG. 3, the primary extrusion gear pump suction pressure signal 216 is sent to both the first controller 202 and the second controller 204. In other words, the primary suction pressure signal 216 is split between the first controller 202 and the second controller 204.

Use of the extrusion gear pump suction pressure sensor 178 and the redundant extrusion gear pump pressure sensor 212 may improve the reliability of the extrusion gear pump 22. Specifically, a mismatch interlock (e.g., a logical control mechanism or module) may compare the values of the primary and redundant suction pressure signals 216 and 214. If a difference in the values of the primary and redundant pressure signals 216 and 214 exceeds a threshold, the mismatch interlock may activate to shutdown the extrusion gear pump 22. For example, the mismatch interlock may activate if the difference between the primary and redundant suction pressure signals 216 and 214 is greater than approximately 1375 kPa. A problem with one or both of the suction pressure sensors 178 and 212 may be indicated when the difference between the primary and redundant suction pressure signals 216 and 214 exceeds the mismatch interlock threshold. In various embodiments, the mismatch interlock may reside in the DCS 200, the first controller 202, the second controller 204, or any combination thereof. Thus, the primary and redundant suction pressure signals 216 and 214 may be provided to the appropriate controller to execute the mismatch interlock.

In other embodiments, the second controller 204 may include a high suction pressure interlock (e.g., a logical control mechanism or module). Specifically, the second controller 204 may compare the value of the primary pressure signal 216 with a high suction pressure threshold. If the value of the primary pressure signal 216 exceeds the high suction pressure threshold, the second controller 204 may shutdown the extrusion gear pump 22, as discussed in detail below.

In certain embodiments, one or both of the suction pressure sensors 178 and 212 may be configured with output damping implemented within the suction pressure sensors 178 and 212. The output damping may provide a smoother representation of the suction pressure from the suction pressure sensors 178 and 212 to the appropriate controllers. For example, in one embodiment, the suction pressure sensors 178 and 212 may be configured with output damping of greater than approximately one second.

As shown in FIG. 3, one or more signals may pass between the DCS 200 and the first and second controllers 202 and 204. Specifically, the DCS 200 and the first and second controllers 202 and 204 may include one or more I/O connections for receiving and sending signals. For example, a manual output speed reference signal 218 may be sent from the DCS 200 to the first controller 202 as an analog input. The manual output speed reference signal 218 may range from zero percent to 100 percent and be used by the DCS 200 to control the speed of the extrusion gear pump motor 24 manually. In other words, an operator may set a particular percentage value for the manual output speed reference signal 218 that is sent to the first controller 202, which then sends a signal to the VSD 180 or motor controller 206 to achieve a desired speed of the extrusion gear pump motor 24. A higher value of the manual output speed reference signal 218 may correspond to a higher speed of the extrusion gear pump motor 24. In addition, a suction pressure setpoint signal 220 may be sent by the DCS 200 to the first controller 202 as an analog input. The value of the suction pressure setpoint 220 may be expressed in units of pressure, such as kPa. Thus, an operator may provide a desired value for the suction pressure (i.e., a setpoint) to the DCS 200, which then sends the suction pressure setpoint signal 220 to the first controller 202, which in turn sends signals to the extrusion gear pump motor 24 to achieve the desired suction pressure, as described in detail below. Thus, use of the disclosed techniques may enable improved control of the extrusion gear pump 22 over a range of suction pressure setpoints. For example, different suction pressure setpoints may be associated with difference types of polyolefin fluff 12 handled by the extrusion system 10. In addition, the DCS 200 may send a gear pump mode signal 222 to the second controller 204. For example, the gear pump mode signal 222 may be used by the DCS 200 to set the second controller 204 in either an automatic mode or a manual mode. Generally, a controller is configured to control a system in the automatic mode and an operator controls the system in manual mode.

In addition, the DCS 200 may receive an output indication signal 224 from the first controller 202, which may indicate a first controller 202 output indication or read back to the DCS 200 (e.g., an analog output of between 0 to 100%), a first controller 202 system status to the DCS 200 (e.g., a digital output representing an alarm or "OK" status), a first controller 202 automatic/manual status feedback to the DCS 200 (e.g., a digital output representing "AUTO" or "MAN"), or any combination thereof. For example, the DCS 200 may compare the output indication signal 224 with the manual output speed reference signal 218 and/or suction pressure setpoint signal 220 to ensure that the suction pressure of the extrusion gear pump 22 is being properly controlled. In addition, the first controller 202 may generate an output signal 226 to the motor controller 206 of the VSD 180. The output signal 226 may be expressed in percent from zero percent to 100 percent output. Thus, the output signal 226 may be used by the first controller 202 to provide the desired output directly to the motor controller 206. A higher value of the output signal 226 may correspond to a higher speed of the extrusion gear pump motor 24. As discussed above, the first controller 202 may be characterized by a fast scanning speed. Thus, the first controller 202 may be able to generate the appropriate output signal 226 to respond to variations of the suction pressure of the extrusion gear pump 22 faster than other controllers.

In certain embodiments, the first controller 202 may be a PI (proportional-integral) controller or PID (proportional-integral-derivative) controller with certain tuning parameters to provide the output signal 226. In one embodiment, the tuning parameters of the first controller 202 may include a gain of between approximately 0.4 to approximately 0.6 and an integral time between approximately 25 seconds to approximately 35 seconds. Use of such tuning parameters for the first controller 202 may improve the control of the extrusion gear pump 22 suction pressure by improving the response of the first controller 202. In some embodiments, the first controller 202 may include adaptive tuning circuitry to automatically adjust one or more tuning parameters of the first controller 202 based on disturbances in the extrusion gear pump suction pressure. Specifically, the adaptive tuning circuitry may utilize auto regressive moving average (ARMA) or pattern recognition to adjust the tuning parameters of the first controller 202 when changes in the process are detected.

Based on the output signal 226 from the first controller 202 to the motor controller 206, the motor controller 206 may send a speed signal 228 to the extrusion gear pump motor 24. For example, the motor controller 206 may be a PI or PID controller with certain tuning parameters to provide the speed signal 228. In one embodiment, the tuning parameters of the motor controller 206 may include a gain between approximately 3 to approximately 5 and an integral time between approximately 300 milliseconds to approximately 400 milliseconds. Use of such tuning parameters for the motor controller 206 may improve the control of the extrusion gear pump 22 suction pressure by improving the response of the motor controller 206. In addition, certain physical characteristics of the motor controller 206 may enable improved control of the extrusion gear pump 22 suction pressure. Specifically, the motor controller 206 may have a speed ramp (i.e., acceleration time) of less than approximately 5 milliseconds, a speed control and torque reference and current control of less than approximately 2.7 milliseconds, a PID control of less than approximately 5 milliseconds, an analog input speed of less than approximately 5 milliseconds or less than approximately 2.8 milliseconds, an analog output speed of less than approximately 5 milliseconds, digital input and output speeds of less than approximately 2.8 milliseconds, or any combination thereof. Such fast speeds of the motor controller 206 may enable the control system 40 to respond to variations in the suction pressure of the extrusion gear pump 22 faster than other motor controllers. For example, the motor controller 206 may enable the transition from an automatic mode to a manual mode to be performed faster during startup of the extrusion gear pump 22.

The speed signal 228 provided by the motor controller 206 may represent the voltage and/or amperage corresponding to the desired speed for the extrusion gear pump motor 24. In certain embodiments, the motor controller 206 may include a clamp configured so that the speed signal 228 to the extrusion gear pump motor 24 does not exceed a high voltage and/or high amperage threshold. In other words, the clamp prevents the motor controller 206 from generating a speed signal 228 that exceeds a predetermined value. In certain embodiments, a high amperage signal 230 (i.e., an electric current signal) may be sent from the motor controller 206 to the second controller 204 to be used by a high electric current interlock (e.g., a logical control mechanism or module) of the second controller 204 to shut down the extrusion gear pump 22 upon a high-amp or high-current situation of the extrusion gear pump motor 24. For example, if the high electric current interlock determines that the high amperage signal 230 is above a predetermined high-amp or high-current threshold, the second controller 204 may shut down or trip the extrusion gear pump 22 by sending a signal to the first controller 202 that then send the output signal 226 to shut down the motor 24. Further, in certain embodiments, a mode signal 232 may be sent from the second controller 204 to the first controller 202 as a digital input to pass on the mode information conveyed in the mode signal 222 sent by the DCS 200 to the second controller 204. For example, the high suction pressure interlock of the second controller 204 may use the mode signal 222 to shutdown the extrusion gear pump 22. In other embodiments, the VSD 180 may not include the motor controller 206. In such embodiments, the VSD 180 may receive the output signal 226 and generate the speed signal 228 and high amperage signal 230.

In certain embodiments, one or more of the DCS 200 and the first and second controllers 202 and 204 may be configured to synchronize the manual output speed reference signal 218, suction pressure setpoint signal 220, and the mode signal 232 during a mode change such that a variability of the suction pressure of the extrusion gear pump 22 after the mode change is less than approximately 1 percent of a span (i.e., operating range) of the extrusion gear pump suction pressure sensor 178 and/or the redundant extrusion gear pump suction pressure sensor 212. By reducing the variability of the extrusion gear pump 22 suction pressure via such synchronization, the likelihood of shutting down the extrusion gear pump 22, such as via the high suction pressure interlock, is reduced. In other words, reducing the variability of the suction pressure lessens the likelihood that a momentary spike in the suction pressure exceeds the value of the interlock threshold. Thus, the reliability and operating time of the extrusion gear pump 22 may be increased.

Figure 4:
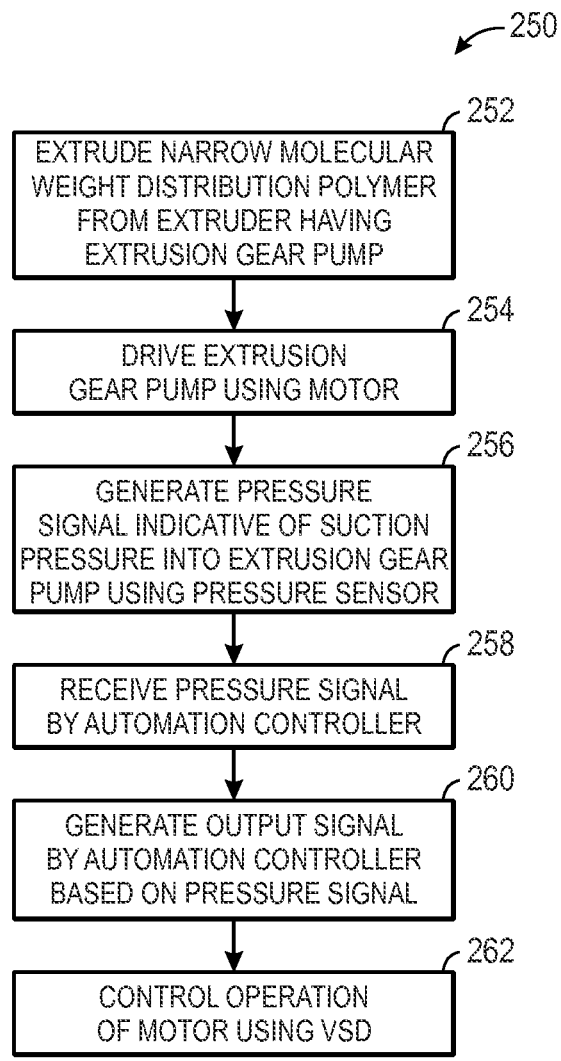
FIG. 4 is a flow chart depicting a method for operating the extrusion gear pump in accordance with present embodiments.

FIG. 4 is a flow chart depicting a method 250 for operating the extrusion gear pump 22. The method 250 may begin by extruding the narrow molecular weight distribution polymer from the extruder 18 having the extrusion gear pump 22 (block 252). Specifically, the polymer extruded by the extruder 18 may be characterized by a narrow molecular weight distribution, as described in detail above. When extruding such polymers, high extrusion gear pump 22 suction pressures may be used. Thus, improved control of the suction pressure of the extrusion gear pump 22 may be important when extruding the narrow molecular weight distribution polymer to avoid shutting down or tripping the extrusion gear pump 22 when the suction pressure exceeds a high suction pressure threshold. For example, when the suction pressure approaches the high suction pressure threshold, the control system 40 may be used to increase the speed of the extrusion gear pump 22, thereby decreasing the suction pressure. Thus, use of the control system 40 described in detail above may be ideally suited for controlling the suction pressure of the extrusion gear pump 22 when the extruder 18 is extruding the narrow molecular weight distribution polymer. Next, the extrusion gear pump 22 may be driven by the extrusion gear pump motor 24 (block 254) at a level designated by the control system 40. In certain embodiments, the gearbox 172 may be used between the extrusion gear pump 22 and the extrusion gear pump motor 24. The primary pressure signal 216 may be generated by the primary extrusion gear pump suction pressure sensor 178 and/or the redundant suction pressure signal 214 may be generated by the redundant extrusion gear pump suction pressure sensor 212 (block 256). Both the signals 214 and 216 may be indicative of the suction pressure of the extrusion gear pump 22. One or both of the suction pressure signals 214 and 216 may be received by one or more of the first controller 202, second controller 204, DCS 200, or any combination thereof (block 258). In one embodiment, the DCS 200 receives the redundant suction pressure signal 214 and the first and second controllers 202 and 204 receive the primary extrusion gear pump suction pressure signal 216.

The first controller 202, the second controller 204, and/or the DCS 200 may generate one or more output signals based on the received pressure signals 214 and 216 (block 260). Next, the operation of the extrusion gear pump motor 24 may be controlled using the VSD 180 (block 262). For example, in certain embodiments, the motor controller 206 of the VSD 180 may be used to control the operation of the extrusion gear pump motor 24.

ADDITIONAL DESCRIPTION

Systems and methods for polymer extrusion have been described. The following clauses are offered as further description of the disclosure.

Embodiment 1

A system, comprising: an extrusion gear pump configured to receive a narrow molecular weight distribution polyolefin from a polyolefin manufacturing system; a motor of the extrusion gear pump configured to drive the extrusion gear pump; a pressure sensor configured to generate a pressure signal indicative of a suction pressure into the extrusion gear pump; an automation controller configured to generate an output signal based on the pressure signal; and a variable speed drive configured to control operation of the motor.

Embodiment 2

The system of embodiment 1, wherein the narrow molecular weight distribution polyolefin is at least partially melted, has a value of a weight average molecular weight $M_w$ divided by a number average molecular weight $M_n$ between approximately 2 to approximately 4, or any combination thereof.

Embodiment 3

The system defined in any preceding embodiment, wherein the automation controller is configured to receive the pressure signal as an analog input via a dedicated hardwire connection with the pressure sensor.

Embodiment 4

The system defined in any preceding embodiment, wherein the variable speed drive is configured to utilize the output signal as a speed reference signal to control the motor.

Embodiment 5

The system defined in any preceding embodiment, wherein the variable speed drive comprises a motor controller configured to utilize the output signal to control the motor.

Embodiment 6

The system defined in any preceding embodiment, comprising a tachometer coupled to a shaft of the motor and configured to provide a motor speed as a feedback signal to the motor controller of the variable speed drive.

Embodiment 7

The system defined in any preceding embodiment, wherein tuning parameters of the motor controller comprise a gain between approximately 3 to approximately 5 and an integral time between approximately 300 milliseconds to approximately 400 milliseconds.

Embodiment 8

The system defined in any preceding embodiment, wherein a scanning speed of the automation controller is less than approximately 20 milliseconds.

Embodiment 9

The system defined in any preceding embodiment, comprising an additional automation controller configured to receive the pressure signal via a connection with the pressure sensor, wherein the additional automation controller utilizes the pressure signal as an input to a high suction pressure interlock.

Embodiment 10

The system defined in any preceding embodiment, comprising an additional automation controller configured to receive an electric current signal via a connection with the variable speed drive, wherein the additional automation controller utilizes the electric current signal as an input to a high electric current interlock.

Embodiment 11

The system defined in any preceding embodiment, wherein the automation controller comprises an input/output (I/O) connection with a distributed control system (DCS), the I/O connection being configured to transfer from the DCS to the automation controller a setpoint for the suction pressure, a manual output speed reference signal used to generate the output signal to the variable speed drive, a gear pump mode signal, or any combination thereof.

Embodiment 12

The system defined in any preceding embodiment, wherein the automation controller and the DCS are configured to synchronize the setpoint, the manual output speed reference signal, and the gear pump mode signal during a mode change such that a variability of the suction pressure after the mode change is less than approximately 1 percent of a span of the pressure sensor.

Embodiment 13

The system defined in any preceding embodiment, comprising a distributed control system (DCS) and an additional pressure sensor configured to provide an additional pressure signal indicative of the suction pressure to the DCS, wherein the DCS is configured to compare the pressure signal and the additional pressure signal to control a mismatch interlock.

Embodiment 14

The system defined in any preceding embodiment, wherein the pressure sensor and the additional pressure sensor are each configured with an output damping of less than approximately 1 second.

Embodiment 15

The system defined in any preceding embodiment, wherein tuning parameters of the automation controller comprise a gain of between approximately 0.4 to approximately 0.6 and an integral time between approximately 25 seconds to approximately 35 seconds.

Embodiment 16

The system defined in any preceding embodiment, wherein the automation controller comprises adaptive tuning circuitry configured to automatically adjust one or more tuning parameters of the automation controller based on a disturbance in the suction pressure.

Embodiment 17

A polyolefin extrusion system, comprising: an extrusion gear pump; a motor of the extrusion gear pump configured to drive the extrusion gear pump; a pressure sensor configured to generate a pressure signal indicative of a suction pressure into the extrusion gear pump; a first automation controller configured to receive the pressure signal as an analog input via a dedicated hardwire connection with the pressure sensor and configured to generate an output signal based on the pressure signal and a setpoint for the suction pressure; a second automation controller configured to receive the pressure signal via a direct connection with the pressure sensor, wherein the second automation controller utilizes the pressure signal as an input to a high suction pressure interlock; and a variable speed drive configured to control operation of the motor, wherein the variable speed drive is configured to utilize the output signal as a speed reference signal to control the motor.

Embodiment 18

The system defined in any preceding embodiment, wherein the extrusion gear pump is configured to receive a narrow molecular weight distribution polyolefin from a polyolefin manufacturing system.

Embodiment 19

The system defined in any preceding embodiment, comprising an additional pressure sensor configured to generate an additional pressure signal indicative of the suction pressure into the extrusion gear pump, wherein the additional pressure sensor is configured to provide the additional pressure signal to a distributed control system (DCS), wherein the DCS is configured to compare the pressure signal and the additional pressure signal to control a mismatch interlock.

Embodiment 20

The system defined in any preceding embodiment, wherein a scanning speed of the first automation controller is less than approximately 20 milliseconds.

Embodiment 21

A method, comprising: extruding a narrow molecular weight distribution polyolefin from an extruder having an extrusion gear pump; driving the extrusion gear pump using a motor; generating a pressure signal indicative of a suction pressure into the extrusion gear pump using a pressure sensor; receiving the pressure signal by an automation controller; generating an output signal by the automation controller based on the pressure signal; and controlling operation of the motor using a variable speed drive, wherein the variable speed drive is configured to utilize the output signal as a speed reference signal to control the motor.

Embodiment 22

The method or system defined in any preceding embodiment, comprising controlling operation of the motor using a motor controller of the variable speed drive; and providing a motor speed as a feedback signal to the motor controller of the variable speed drive using a tachometer coupled to a shaft of the motor.

Embodiment 23

The method or system defined in any preceding embodiment, comprising receiving the pressure signal by the automation controller at a scanning speed of less than approximately 20 milliseconds.

Embodiment 24

The method or system defined in any preceding embodiment, comprising receiving the pressure signal by an additional automation controller via a connection with the pressure sensor, wherein the additional automation controller utilizes the pressure signal as an input to a high suction pressure interlock.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A polyolefin extrusion system, comprising:
   an extrusion gear pump to receive a narrow molecular weight distribution polyolefin from a polyolefin manufacturing system;
   a motor of the extrusion gear pump configured to drive the extrusion gear pump;
   a pressure sensor configured to generate a pressure signal indicative of a suction pressure into the extrusion gear pump;
   an automation controller configured to generate an output signal based on the pressure signal;
   a variable speed drive configured to control operation of the motor;
   a distributed control system (DCS) comprising a mismatch interlock module; and
   an additional pressure sensor to provide an additional pressure signal indicative of the suction pressure to the DCS, wherein the DCS is configured to compare the pressure signal and the additional pressure signal to control the mismatch interlock module.

2. The system of claim 1, wherein the narrow molecular weight distribution polyolefin is at least partially melted, and has a polydispersity index between approximately 2 to approximately 4.

3. The system of claim 1, wherein the automation controller is configured to receive the pressure signal as an analog input via a dedicated hardwire connection with the pressure sensor.

4. The system of claim 1, wherein the variable speed drive is configured to utilize the output signal as a speed reference signal to control the motor.

5. The system of claim 1, wherein the variable speed drive comprises a motor controller configured to utilize the output signal to control the motor.

6. The system of claim 5, comprising a tachometer coupled to a shaft of the motor and configured to provide a motor speed as a feedback signal to the motor controller of the variable speed drive.

7. The system of claim 5, wherein tuning parameters of the motor controller comprise a gain between approximately 3 to approximately 5 and an integral time between approximately 300 milliseconds to approximately 400 milliseconds, wherein the gain is expressed in units of amperage/motor speed or voltage/motor speed.

8. The system of claim 1, wherein a scanning speed of the automation controller is less than approximately 20 milliseconds.

9. The system of claim 1, comprising an additional automation controller configured to receive the pressure signal via a connection with the pressure sensor, wherein the additional automation controller utilizes the pressure signal as an input to a high suction pressure interlock module of the additional automation controller.

10. The system of claim 1, comprising an additional automation controller configured to receive an electric current signal via a connection with the variable speed drive, wherein the additional automation controller utilizes the electric current signal as an input to a high electric current interlock module of the additional automation controller.

11. The system of claim 1, wherein the automation controller comprises an input/output (I/O) connection with the DCS, the I/O connection being configured to transfer from the DCS to the automation controller a setpoint for the suction pressure, a manual output speed reference signal used to generate the output signal to the variable speed drive, a gear pump mode signal, or any combination thereof.

12. The system of claim 11, wherein the automation controller and the DCS are configured to synchronize the setpoint, the manual output speed reference signal, and the gear pump mode signal during a mode change such that a variability of the suction pressure after the mode change is less than approximately 1 percent of a span of the pressure sensor.

13. The system of claim 1, wherein the pressure sensor and the additional pressure sensor are each configured with an output damping of less than approximately 1 second.

14. The system of claim 1, wherein tuning parameters of the automation controller comprise a gain of between approximately 0.4 to approximately 0.6 and an integral time between approximately 25 seconds to approximately 35 seconds, wherein the gain is expressed in units of inverse pressure.

15. The system of claim 1, wherein the automation controller comprises adaptive tuning circuitry configured to automatically adjust one or more tuning parameters of the automation controller based on a disturbance in the suction pressure.

16. A polyolefin extrusion system, comprising:
   an extrusion gear pump;
   a motor of the extrusion gear pump configured to drive the extrusion gear pump;

a pressure sensor configured to generate a pressure signal indicative of a suction pressure into the extrusion gear pump;
a first automation controller configured to receive the pressure signal as an analog input via a dedicated hardwire connection with the pressure sensor and configured to generate an output signal based on the pressure signal and a suction pressure setpoint signal for the suction pressure;
a second automation controller configured to receive the pressure signal via a direct connection with the pressure sensor, wherein the second automation controller utilizes the pressure signal as an input to a high suction pressure interlock module of the second automation controller; and
a variable speed drive configured to control operation of the motor, wherein the variable speed drive is configured to utilize the output signal as a speed reference signal to control the motor.

17. The system of claim 16, wherein the extrusion gear pump is to receive a narrow molecular weight distribution polyolefin from a polyolefin manufacturing system.

18. The system of claim 16, comprising an additional pressure sensor configured to generate an additional pressure signal indicative of the suction pressure into the extrusion gear pump, wherein the additional pressure sensor is configured to provide the additional pressure signal to a distributed control system (DCS), wherein the DCS is configured to compare the pressure signal and the additional pressure signal to control a mismatch interlock module of the DCS.

19. The system of claim 16, wherein a scanning speed of the first automation controller is less than approximately 20 milliseconds.

20. A polyolefin extrusion system, comprising:
an extrusion gear pump to receive a narrow molecular weight distribution polyolefin from a polyolefin manufacturing system;
a motor of the extrusion gear pump configured to drive the extrusion gear pump;
a pressure sensor configured to generate a pressure signal indicative of a suction pressure into the extrusion gear pump;
a variable speed drive configured to control operation of the motor; and
an automation controller configured to generate an output signal based on the pressure signal, wherein the automation controller comprises an input/output (I/O) connection with a distributed control system (DCS), the I/O connection being configured to transfer from the DCS to the automation controller a setpoint for the suction pressure, a manual output speed reference signal used to generate the output signal to the variable speed drive, a gear pump mode signal, or any combination thereof, and the automation controller and the DCS are configured to synchronize the setpoint, the manual output speed reference signal, and the gear pump mode signal during a mode change, such that a variability of the suction pressure after the mode change is less than approximately 1 percent of a span of the pressure sensor.

* * * * *